United States Patent
Ozturk et al.

(10) Patent No.: US 12,120,572 B2
(45) Date of Patent: Oct. 15, 2024

(54) ACTIVATION OF A SECONDARY CELL GROUP USING A USER EQUIPMENT CONFIGURED FOR DUAL CONNECTIVITY WITH MULTIPLE RADIO ACCESS TECHNOLOGIES

(71) Applicant: QUALCOMM Incorporated, San Diego, CA (US)

(72) Inventors: Ozcan Ozturk, San Diego, CA (US); Punyaslok Purkayastha, San Diego, CA (US); Ravi Agarwal, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/328,222

(22) Filed: May 24, 2021

(65) Prior Publication Data

US 2022/0007256 A1 Jan. 6, 2022

Related U.S. Application Data

(60) Provisional application No. 63/047,197, filed on Jul. 1, 2020.

(51) Int. Cl.
*H04W 36/30* (2009.01)
*H04W 36/00* (2009.01)
*H04W 74/0833* (2024.01)

(52) U.S. Cl.
CPC ..... *H04W 36/305* (2018.08); *H04W 36/0061* (2013.01); *H04W 36/0077* (2013.01);
(Continued)

(58) Field of Classification Search
CPC .......... H04W 36/305; H04W 36/0061; H04W 36/0069; H04W 36/0077;
(Continued)

(56) References Cited

U.S. PATENT DOCUMENTS

2013/0258959 A1* 10/2013 Dinan ............... H04W 74/0833 370/329
2017/0041880 A1* 2/2017 Ouchi .................. H04L 5/0053
(Continued)

FOREIGN PATENT DOCUMENTS

WO WO-2020197306 A1 10/2020

OTHER PUBLICATIONS

Apple: "SCG Suspension," 3GPP Draft, 3GPP TSG-RAN WG2 Meeting #108, R2-1915933, 3rd Generation Partnership Project (3GPP), Mobile Competence Centre, 650, Route Des Lucioles, F-06921, Sophia-Antipolis Cedex, France, vol. RAN WG2. No. Reno. Nevada, US, Nov. 18, 2019-Nov. 22, 2019, Nov. 8, 2019 (Nov. 8, 2019), XP051817494, 3 pages, Retrieved from the Internet: URL: https://ftp.3gpp.org/tsg_ran/WG2_RL2/TSGR2_108/Docs/R2-1915933.zip R2-1915933_SCG Suspension_v0.doc [retrieved-on Nov. 8, 2019] paragraph [02.2], figure 1.
(Continued)

*Primary Examiner* — Kan Yuen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may detect radio link failure on a master cell group. Accordingly, the UE may determine a state of a secondary cell group (SCG). Additionally, the UE may initiate activation of the SCG based at least in part on the state of the SCG. For example, the activation of the SCG may be initiated based at least in part on the state being a deactivated state,
(Continued)

a dormant state, or an enhanced dormant state. Accordingly, the UE may transmit master cell group (MCG) failure recovery information over the SCG and receive, on the SCG, MCG reconnection information. Numerous other aspects are provided.

27 Claims, 11 Drawing Sheets

(52) U.S. Cl.
CPC . *H04W 36/00835* (2018.08); *H04W 36/0085* (2018.08); *H04W 74/0833* (2013.01)

(58) Field of Classification Search
CPC ....... H04W 36/00835; H04W 36/0085; H04W 74/0833; H04W 76/19; H04W 76/15; H04W 74/0836; H04W 74/0838
See application file for complete search history.

(56) References Cited

U.S. PATENT DOCUMENTS

| | | | | |
|---|---|---|---|---|
| 2018/0020444 | A1* | 1/2018 | Lee | H04W 76/27 |
| 2020/0091984 | A1* | 3/2020 | Dinan | H04L 1/1825 |
| 2021/0013951 | A1* | 1/2021 | Chen | H04W 76/27 |
| 2021/0112617 | A1* | 4/2021 | Zhang | H04W 76/15 |
| 2022/0086710 | A1* | 3/2022 | Xu | H04W 36/305 |
| 2022/0116874 | A1* | 4/2022 | Xu | H04W 52/0225 |
| 2022/0141904 | A1* | 5/2022 | Yilmaz | H04L 5/0035 |
| | | | | 370/329 |
| 2022/0159483 | A1* | 5/2022 | Lee | H04W 76/19 |
| 2022/0167445 | A1* | 5/2022 | Wang | H04L 1/0025 |
| 2022/0225203 | A1* | 7/2022 | Hu | H04W 24/10 |
| 2022/0256637 | A1* | 8/2022 | Futaki | H04W 76/15 |
| 2022/0304092 | A1* | 9/2022 | Wu | H04W 76/15 |
| 2022/0394583 | A1* | 12/2022 | Deenoo | H04W 24/08 |
| 2023/0171838 | A1* | 6/2023 | Zhang | H04W 52/0229 |
| | | | | 370/329 |
| 2023/0284314 | A1* | 9/2023 | Wu | H04W 76/15 |
| | | | | 370/329 |

OTHER PUBLICATIONS

International Search Report and Written Opinion—PCT/US2021/034032—ISA/EPO—Sep. 23, 2021.

LG Electronics Inc: "Utilization of MCG Failure Recovery Via SCG Link," 3GPP Draft, 3GPP TSG-RAN2#107, R2-1911314, Utilization of MCG Failure Recovery Via SCG link, 3rd Generation Partnership Project (3GPP), Mobile Competence Centre, 650, Route Des Lucioles, F-06921, Sophia-Antipolis Cedex, France, vol. RAN WG2. No. Prague. Czech Republic, Aug. 26, 2019-Aug. 30, 2019, Aug. 16, 2019 (Aug. 16, 2019), XP051769071, 2 pages, Retrieved from the Internet: URL: http://www.3gpp.org/ftp/tsg_ran/WG2_RL2/TSGR2_107/Docs/R2-1911314.zip [retrieved on Aug. 16, 2019] the whole document.

"3rd Generation Partnership Project; Technical Specification Group Radio Access Network; NR; Medium Access Control (MAC) protocol specification (Release 16)", 3GPP TS 38.321, V16.0.0 (Mar. 2020), 140 Pages.

"3rd Generation Partnership Project; Technical Specification Group Radio Access Network; NR; NR and NG-RAN Overall Description; Stage 2 (Release 16)", 3GPP TS 38.300, V16.1.0 (Mar. 2020), 133 Pages.

* cited by examiner

| Deactivated | Dormant | Enhanced Dormant | Activated |
|---|---|---|---|
| • No PDCCH monitoring on PSCell<br>• No UL transmissions on PSCell<br>• No CSI measurements on PSCell<br>• Does not maintain UL timing alignment with the SN<br>• Performs RRM measurements on PSCell. Measurement reports transmitted on MCG<br>• No RLM measurements | • No PDCCH monitoring on PSCell<br>• No UL transmissions on PSCell<br>• Performs CSI measurements on PSCell. No CSI reports to network<br>• Does not maintain UL timing alignment with the SN<br>• Performs RRM measurements on PSCell. Measurement reports transmitted on MCG<br>• No RLM measurements | • No PDCCH monitoring on PSCell<br>• Performs CSI measurements on PSCell<br>• Transmits CSI reports on PSCell PUCCH<br>• Maintains UL timing with the SN<br>• Performs RRM measurements on PSCell. Measurement reports transmitted on MCG<br>• No RLM measurements | • UE receives PDCCH on PSCell<br>• Regular data transfer (UL, DL) can take place over PSCell |

ACTIVATION OF A SECONDARY CELL GROUP USING A USER EQUIPMENT CONFIGURED FOR DUAL CONNECTIVITY WITH MULTIPLE RADIO ACCESS TECHNOLOGIES

CROSS-REFERENCE TO RELATED APPLICATION

This patent application claims priority to U.S. Provisional Patent Application No. 63/047,197, filed on Jul. 1, 2020, entitled "ACTIVATION OF A SECONDARY CELL GROUP USING USER EQUIPMENT CONFIGURED FOR DUAL CONNECTIVITY WITH MULTIPLE RADIO ACCESS TECHNOLOGIES," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for activating a secondary cell group using a user equipment configured for dual connectivity with multiple radio access technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes detecting radio link failure (RLF) on a master cell group (MCG); determining a state of a secondary cell group (SCG); and initiating, by the UE, activation of the SCG based at least in part on the state of the SCG.

In some aspects, a method of wireless communication performed by a base station within an SCG includes receiving, from a UE, a message to initiate activation of the SCG, wherein, when the base station receives the message, the SCG is in a deactivated state, a dormant state, or an enhanced dormant state, and the UE had detected RLF with an MCG; and transmitting, to the UE, timing advance (TA) information based at least in part on receiving the message.

In some aspects, a UE for wireless communication includes a memory and one or more processors coupled with the memory, the memory and the one or more processors configured to detect RLF on an MCG; determine a state of an SCG; and initiate activation of the SCG based at least in part on the state of the SCG.

In some aspects, a base station within an SCG for wireless communication includes a memory and one or more processors coupled with the memory, the memory and the one or more processors configured to receive, from a UE, a message to initiate activation of the SCG, wherein, when the base station receives the message, the SCG is in a deactivated state, a dormant state, or an enhanced dormant state, and the UE had detected RLF with an MCG; and transmit, to the UE, TA information based at least in part on receiving the message.

In some aspects, a non-transitory computer-readable medium storing a set of instructions for wireless communication includes one or more instructions that, when executed by one or more processors of a UE, cause the UE to detect RLF on an MCG; determine a state of an SCG; and initiate activation of the SCG based at least in part on the state of the SCG.

In some aspects, a non-transitory computer-readable medium storing a set of instructions for wireless communication includes one or more instructions that, when executed by one or more processors of a base station within an SCG, cause the base station to receive, from a UE, a message to initiate activation of the SCG, wherein, when the base station receives the message, the SCG is in a deactivated state, a dormant state, or an enhanced dormant state, and the UE had detected RLF with an MCG; and transmit, to the UE, TA information based at least in part on receiving the message.

In some aspects, an apparatus for wireless communication includes means for detecting RLF on an MCG; means for determining a state of an SCG; and means for initiating activation of the SCG based at least in part on the state of the SCG.

In some aspects, an apparatus within an SCG for wireless communication includes means for receiving, from a UE, a message to initiate activation of the SCG, wherein, when the apparatus receives the message, the SCG is in a deactivated state, a dormant state, or an enhanced dormant state, and the UE had detected RLF with an MCG; and means for transmitting, to the UE, TA information based at least in part on receiving the message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3B is a diagram illustrating an example of SCG states of a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
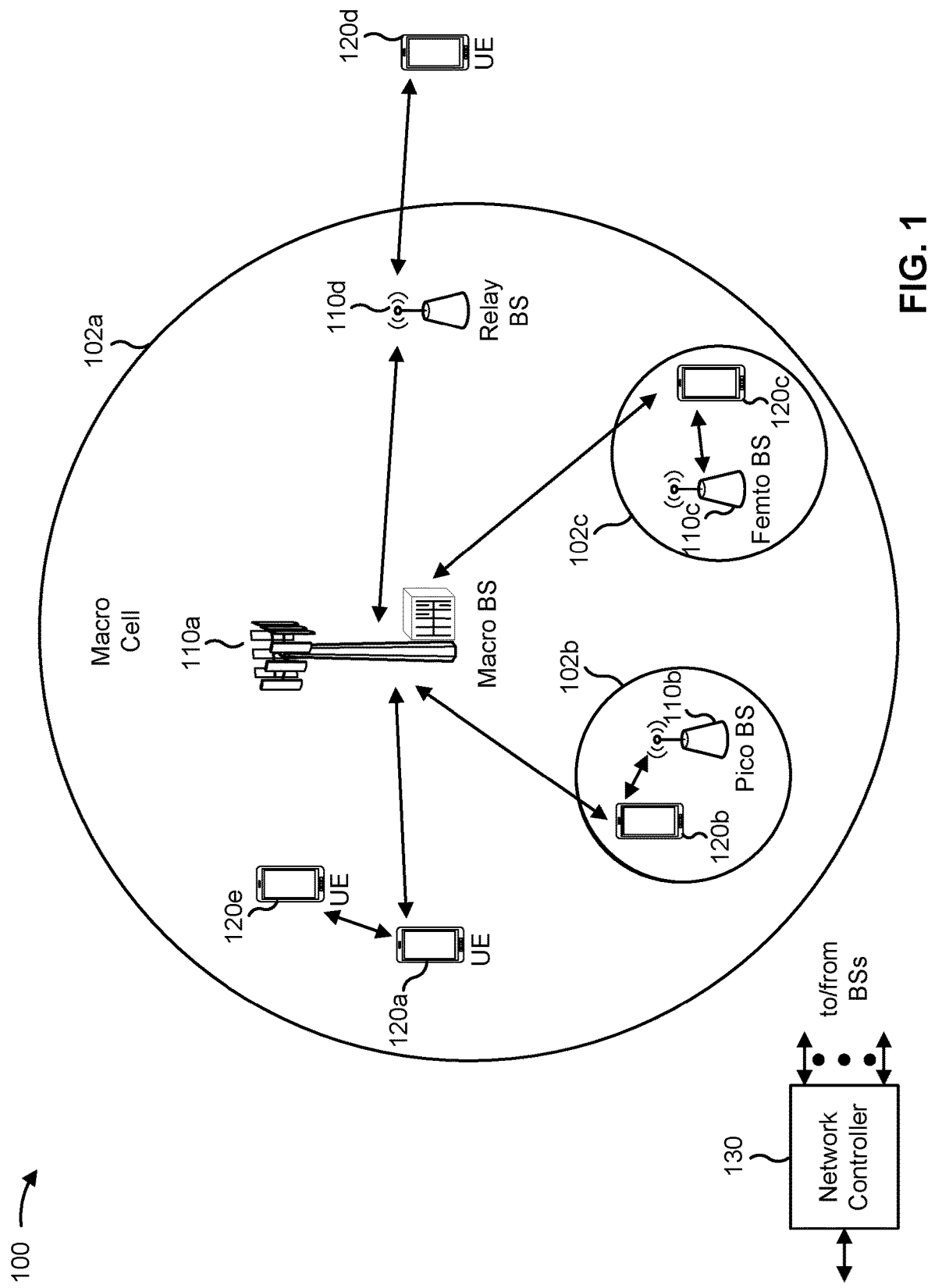
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
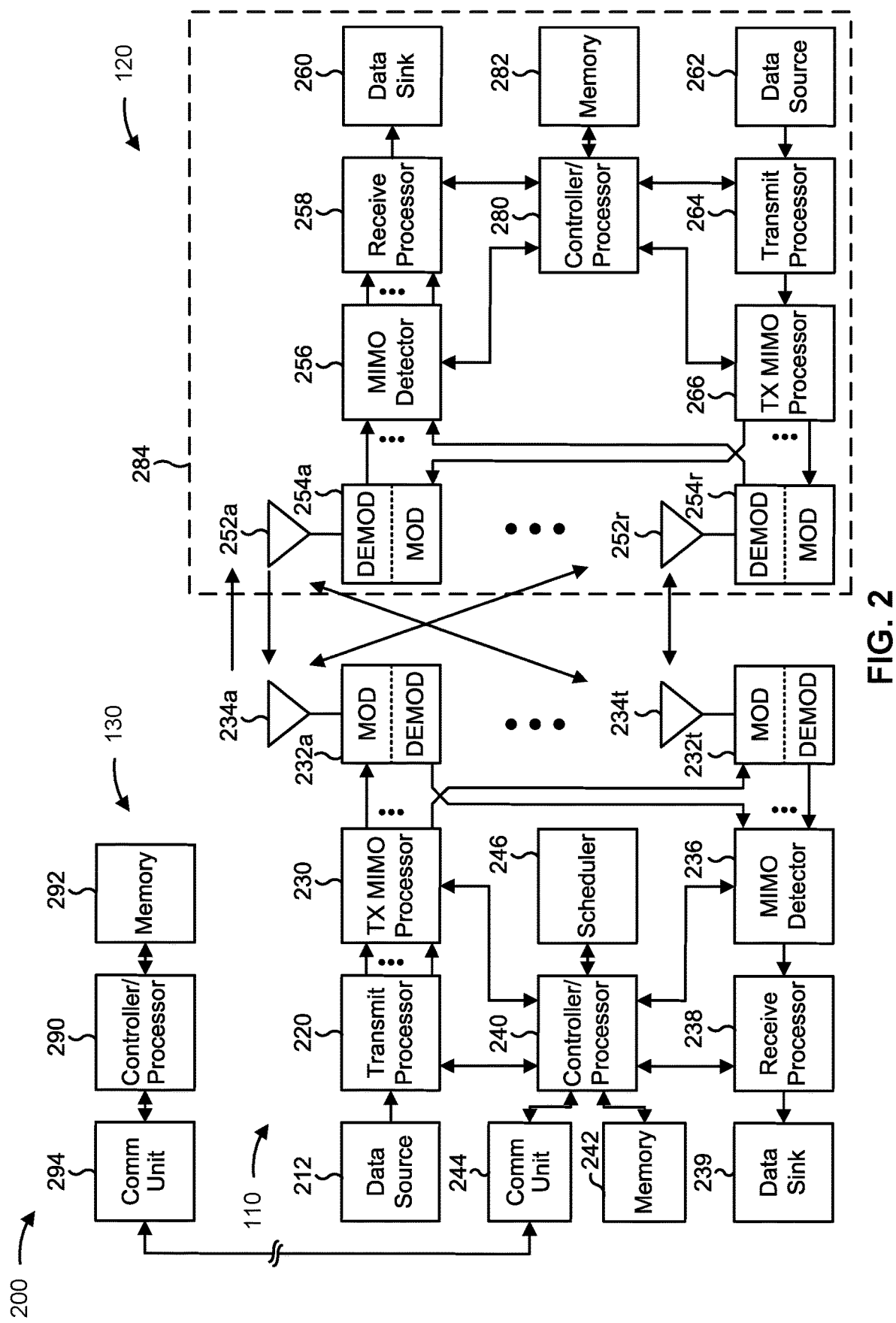
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 7-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 7-10).

Controller/processor 240 of base station 110, controller/processor 280 of UE 120, and/or any other component(s) of FIG. 2 may perform one or more techniques associated with activating a secondary cell group (SCG) using a UE configured for multi-RAT dual connectivity (MR-DC), as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a UE (e.g., the UE 120) may include means for detecting radio link failure (RLF) on a master cell group (MCG); means for determining a state of an SCG; and/or means for initiating activation of the SCG based at least in part on the state of the SCG. The means for the UE to perform operations described herein may include, for example, one or more of controller/processor 280, transmit processor 264, TX MIMO processor 266, MOD 254, antenna 252, DEMOD 254, MIMO detector 256, receive processor 258, or memory 282.

In some aspects, the UE may further include means for receiving timing advance (TA) information over the SCG based at least in part on initiating activation of the SCG. Additionally, or alternatively, the UE may include means for transmitting MCG failure recovery information over the SCG.

In some aspects, the UE may further include means for refraining from transmitting a request for radio resource control (RRC) re-establishment on the MCG based at least in part on detecting the RLF. Additionally, or alternatively, the UE may include means for transmitting MCG failure recovery information over the SCG, which is forwarded to a master node of the MCG; and means for receiving, on the SCG and based at least in part on transmitting the MCG failure recovery information, MCG reconnection information.

Additionally, in some aspects, the UE may include means for receiving and/or means for transmitting, over the SCG and before failure recovery for the MCG is complete, a data transmission.

In some aspects, a base station (e.g., the base station 110) within an SCG may include means for receiving, from a UE, a message to initiate activation of the SCG, wherein, when the base station receives the message, the SCG is in a deactivated state, a dormant state, or an enhanced dormant state, and the UE had detected RLF with an MCG; and/or means for transmitting, to the UE, TA information based at least in part on receiving the message. The means for the base station to perform operations described herein may include, for example, one or more of antenna 234, DEMOD 232, MIMO detector 236, receive processor 238, controller/processor 240, transmit processor 220, TX MIMO processor 230, MOD 232, antenna 234, memory 242, or scheduler 246.

In some aspects, the base station may further include means for receiving, from the UE and based at least in part on the TA information, MCG failure recovery information. Furthermore, the base station may include means for transmitting the MCG failure recovery information to a master node of the MCG. Additionally, the base station may include means for receiving, from the master node and based at least in part on transmitting the MCG failure recovery information, MCG reconnection information; and means for transmitting, to the UE, the MCG reconnection information.

Additionally, in some aspects, the base station may include means for receiving a data transmission intended for the UE; and means for transmitting, to the UE and before failure recovery for the MCG is complete, the data transmission.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
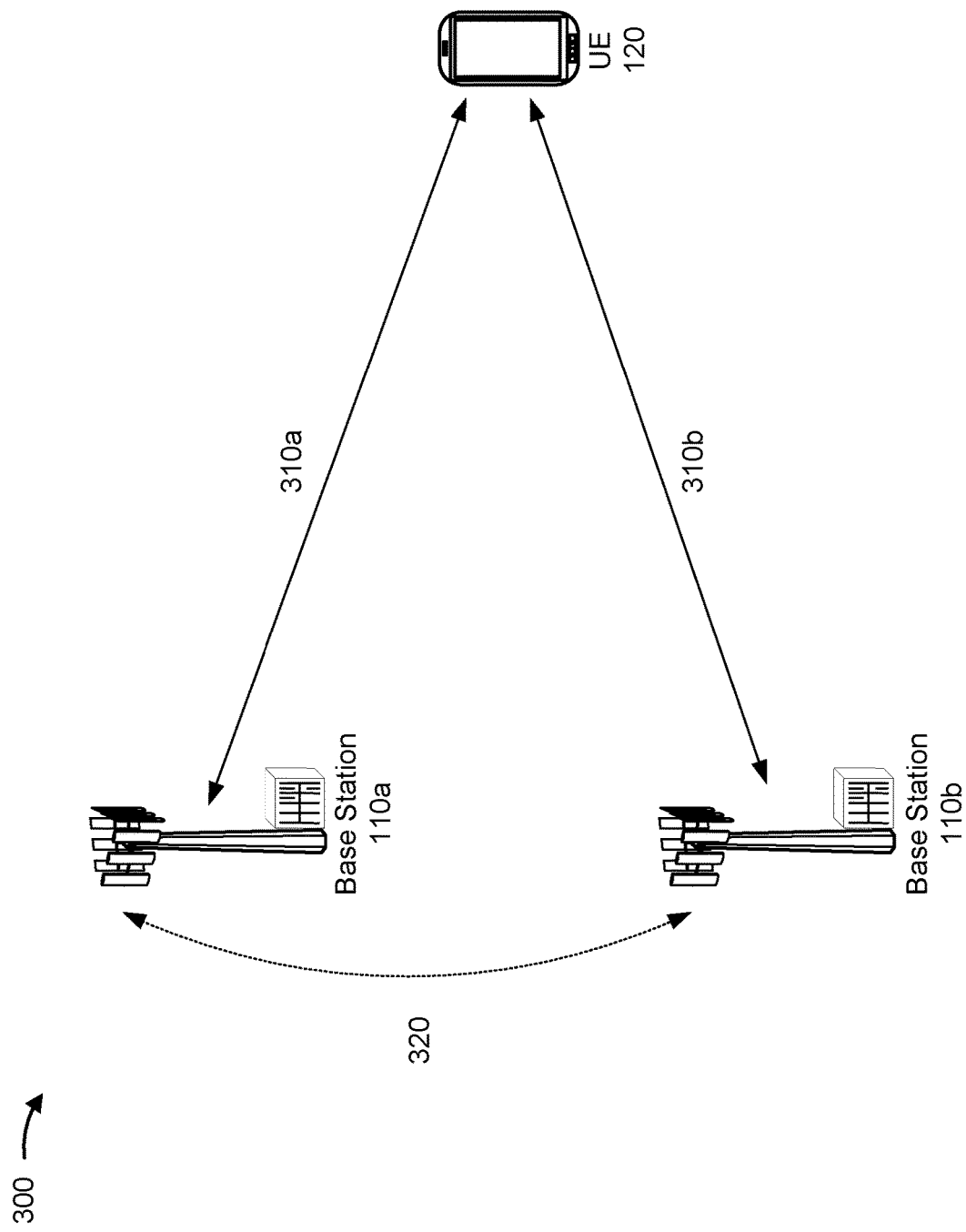
FIG. 3A is a diagram illustrating an example of a UE configured for multi-RAT dual connectivity (MR-DC) with a master cell group (MCG) and a secondary cell group (SCG), in accordance with the present disclosure.

FIG. 3A is a diagram illustrating an example 300 of a UE configured for MR-DC with an MCG and an SCG, in accordance with the present disclosure. As shown in FIG. 3A, example 300 includes a UE 120, a first base station 110*a*, and a second base station 110*b*.

In some aspects, the UE 120 may be a dual connectivity device. For example, dual connectivity may allow the UE 120 to simultaneously transmit and receive data on multiple cell groups via a master base station (e.g., first base station 110*a*), also referred to as a master node (MN), and a secondary base station (e.g., second base station 110*b*), also referred to as a secondary node (SN). In some aspects, dual connectivity may support load-balancing among multiple base stations (e.g., among the first base station 110*a* and the second base station 110*b*).

In some aspects, the UE 120 may indicate a dual connectivity capability to one or more base stations. For example, the UE 120 may transmit, to the first base station 110*a* and/or the second base station 110*b*, a UECapabilityInformation message as defined by 3GPP specifications. Although the description below will focus on a UECapabilityInformation message, the description similarly applies to another message associated with information regarding the dual connectivity capability of the UE 120. In some aspects, the UECapabilityInformation message may be a broadcast message from the UE 120.

In some aspects, the UE 120 may establish and/or request to establish a first communication link 310*a* with the first base station 110*a* (e.g., via a Uu interface). Additionally, or alternatively, the UE 120 may establish and/or request to establish a second communication link 310*b* with the second base station 110*b* (e.g., via a Uu interface). In some aspects, the UE 120 may establish the first communication link 310*a* with the first base station 110*a* based at least in part on a first radio of the UE 120. Similarly, in some aspects, the UE 120 may establish the second communication link 310*b* with the second base station 110*b* based at least in part on a second radio of the UE 120.

In some aspects, the first base station 110*a* may communicate directly with the second base station 110*b*. For example, the first base station 110*a* and the second base station 110*b* may establish a backhaul link 320 (e.g., via an X2, Xn, and/or another similar interface). In some aspects, the backhaul link 320 may include a direct link (e.g., a direct link between base stations 110*a* and 110*b*) and/or an indirect link (e.g., via a core network such as the core network including network controller 130 of FIG. 1).

In some aspects, the first base station 110*a* may send, to the UE 120, downlink control information (DCI) and/or other information indicating that the base station 110*b* has entered a suspended state (e.g., a deactivated state, a dormant state, or an enhanced dormant state, as described below in connection with FIG. 3B). Accordingly, the UE 120 may maintain a lower layer configuration (e.g., a physical (PHY) layer configuration, a medium access control (MAC) configuration, radio link control (RLC) configuration, and/or another layer configuration) for the second base station 110*b*.

In some aspects, the first base station 110*a* may send, to the UE 120, a MAC control element (MAC-CE) and/or other information indicating that the second base station 110*b* has entered an activated state. Accordingly, the UE 120 may re-establish a connection (e.g., second communication link 310*b*) with the second base station 110*b* using the maintained lower layer configuration for the base station 110*b*.

In example 300, the dual connectivity capability may allow the UE 120 to send and/or receive data with one or more base stations from an MCG (e.g., including the first base station 110*a*) and concurrently send and/or receive data with one or more base stations from an SCG (e.g., including the second base station 110*b*). When the SCG (e.g., including the second base station 110*b*) enters a suspended state (e.g., a deactivated state, a dormant state, or an enhanced dormant state, as described below in connection with FIG. 3B), no data traffic is expected between the SCG and an associated UE (e.g., the UE 120). In some aspects, the UE 120 may perform measurements on the last serving base station from the SCG (e.g., the second base station 110*b*). For example, while the second base station 110*b* is in the suspended state (e.g., a dormant state or an enhanced dormant state, as described below in connection with FIG. 3B), the UE 120 may perform the measurements on the second base station 110*b* with a reduced requirement (e.g., longer intervals between measurements for power savings).

In some aspects, when the second base station 110*b* is in the suspended state (e.g., a dormant state or an enhanced dormant state, as described below in connection with FIG. 3B), the UE 120 may be configured to bypass performing some measurements, such as CQI measurements, radio resource management (RRM) measurements, and/or other measurements. For example, the UE 120 may bypass some measurements based on no channel change being expected because the second base station 110*b* has entered the suspended state. Additionally, or alternatively, the UE 120 may be configured for power-efficient measurements (e.g., CQI, RRM, and/or other measurements).

In some aspects (e.g., as described below in connection with the enhanced dormant state of FIG. 3B), the UE 120 may be triggered to report one or more measurements (e.g., CQI measurements) based on a tracking reference signal (TRS). In some aspects, the UE 120 may receive the TRS from at least one of the first base station 110*a* or the second base station 110*b*. In some aspects, the TRS may be periodic or aperiodic. Additionally, or alternatively, the UE 120 may be triggered to report one or more measurements based on DCI from the first base station 110*a* and/or another base station within the MCG.

In some aspects, while the second base station 110*b* is in the suspended state, an upper layer configuration of the second base station 110*b* (e.g., including signaling radio bearer (SRB) and data radio bearer (DRB)) may be maintained at the second base station 110*b*. Additionally, or alternatively, while the second base station 110*b* is in the suspended state, a lower layer configuration of the second base station 110*b* may be maintained by at least one of the second base station 110*b*, the first base station 110*a*, and/or the UE 120. As an alternative, the second base station 110*b* may reconfigure the lower layer configuration of the second base station 110*b* to use lower layer resources of the first base station 110*a* via split bearer (e.g., make DRB of the second base station 110*b* use lower layer resources of the first base station 110*a*). In some aspects, as described above, a MAC-CE, DCI, and/or other message may be used to indicate (e.g., to the UE 120) that the second base station 110*b* is in a suspended state and/or that the second base station 110*b* is activated.

In some aspects, the UE 120 may perform a random access procedure (e.g., a two-step random access procedure as described below in connection with FIG. 4 and/or a four-step random access procedure as described below in connection with FIG. 5) with the second base station 110*b* after receiving an indication from the first base station 110*a* that the second base station 110*b* is activated. Additionally, or alternatively, the UE 120 reconnecting to the second base station 110*b* may include determining a TA parameter of the second base station 110*b* based at least in part on the TA parameter of the first base station 110*a*, a system frame number offset, a first propagation delay between the first base station 110*a* and the UE 120 (e.g., a propagation delay over the first communication link 310a), and/or a second propagation delay between the second base station 110b and the UE 120 (e.g., a propagation delay over the second communication link 310b).

In some aspects, when the SCG (e.g., including the second base station 110b) is a suspended state (e.g., a deactivated state, a dormant state, or an enhanced dormant state, as described below in connection with FIG. 3B), the UE 120 may not expect physical downlink shared channel (PDSCH) and/or physical uplink shared channel (PUSCH) data transfer from the second base station 110b and/or another base station in the SCG. Accordingly, while the second base station 110b is suspended, the UE 120 may bypass monitoring the physical downlink control channel (PDCCH) of the second base station 110b (e.g., which may be a primary secondary cell (PSCell) of the SCG). Additionally, or alternatively, while the second base station 110b is suspended, the UE 120 may bypass transmitting an uplink sounding reference signal (SRS), transmitting on a random access channel (RACH) message, and/or transmitting on a physical uplink control channel (PUCCH) to the second base station 110b (e.g., which may be the PSCell of the SCG, as described above).

In some aspects, the first base station 110a (e.g., which may be an MN of the MCG) may reconfigure a configuration of the second base station 110b (e.g., which may be an SN of the SCG) based on the second base station 110b entering a suspended state. For example, the first base station 110a within the MCG may reconfigure a lower layer configuration (e.g., a PHY layer configuration, a MAC configuration, an RLC configuration, and/or another layer configuration) of the second base station 110b within the SCG to use one or more lower layer resources of the first base station 110a b. Additionally, or alternatively, the first base station 110a may allow the second base station 110b to continue using one or more lower layer resources of the second base station 110b.

As indicated above, FIG. 3A is provided as an example. Other examples may differ from what is described with regard to FIG. 3A.

FIG. 3B is a diagram illustrating an example 330 of SCG states of a UE, in accordance with the present disclosure. FIG. 3B shows a table of SCG states, including an SCG deactivated state, an SCG dormant state, an SCG enhanced dormant state, and an SCG activated state.

When a UE is operating in the SCG deactivated state, the UE may refrain from monitoring a PDCCH on the PSCell, refrain from transmitting uplink communications on the PSCell, refrain from performing channel state information (CSI) measurements on the PSCell, and refrain from maintaining uplink timing alignment with an SN in the PSCell. The UE may also perform RRM measurements on the PSCell (and transmit reports on the MCG), and refrain from performing radio link monitoring (RLM) measurements.

In some aspects, a UE may be in an SCG dormant state or an SCG enhanced dormant state so that the UE may consume less power and/or minimize a transition delay to an SCG activated state. When a UE is operating in the SCG dormant state, the UE may refrain from monitoring a PDCCH on the PSCell, refrain from transmitting uplink communications on the PSCell, and perform CSI measurements in the dormant downlink bandwidth part (BWP) on the PSCell, but refrain from transmitting CSI reports for the PSCell. The UE may refrain from maintaining uplink timing alignment with an SN in the PSCell, perform RRM measurements on the PSCell (and transmit reports on the MCG), and refrain from performing RLM measurements.

When a UE is operating in the SCG enhanced dormant state, the UE may refrain from monitoring a PDCCH on the PSCell, perform CSI measurements in the enhanced dormant downlink BWP on the PSCell, transmit CSI reports in a PUCCH for the PSCell, maintain uplink timing alignment with an SN in the primary secondary cell, perform RRM measurements on the primary secondary cell (and transmit reports on the MCG), and refrain from performing RLM measurements.

When a UE is operating in the SCG activated state, the UE may receive messages on the PDCCH on the PSCell and transfer uplink and/or downlink data over the PSCell. The UE may perform CSI measurements, transmit CSI reports, and maintain uplink timing alignment with an SN in the PSCell. The UE may also perform and report RRM measurements and/or RLM measurements. In other words, when operating in the SCG activated state, the UE may carry out communications using the SCG and perform other operations as expected using an active SCG.

In some aspects, an SCG state of the UE for secondary cells (SCells) may be an SCell deactivated state or an SCell dormant state.

As indicated above, FIG. 3B is provided as an example. Other examples may differ from what is described with respect to FIG. 3B.

Figure 4:
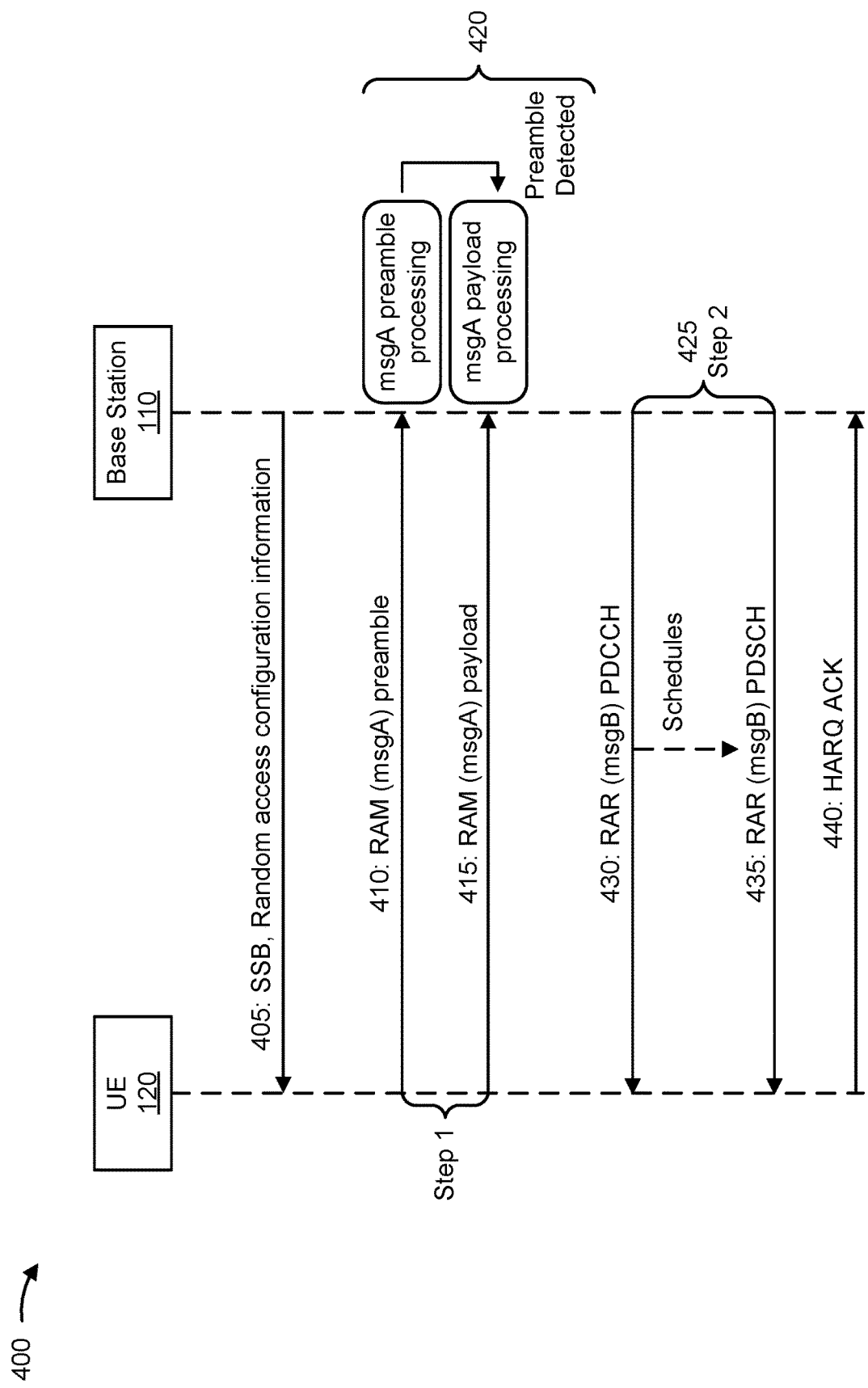
FIG. 4 is a diagram illustrating an example of a two-step random access procedure, in accordance with the present disclosure.

FIG. 4 is a diagram illustrating an example 400 of a two-step random access procedure, in accordance with the present disclosure. As shown in FIG. 4, a base station 110 and a UE 120 may communicate with one another to perform the two-step random access procedure.

As shown by reference number 405, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a PUSCH transmission).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 430, as part of the second step of the two-step random access procedure, the base station 110 may transmit a PDCCH communication for the RAR. The PDCCH communication may schedule a PDSCH communication that includes the RAR. For example, the PDCCH communication may indicate a resource allocation (e.g., in DCI) for the PDSCH communication.

As shown by reference number 435, as part of the second step of the two-step random access procedure, the base station 110 may transmit the PDSCH communication for the RAR, as scheduled by the PDCCH communication. The RAR may be included in a MAC protocol data unit (PDU) of the PDSCH communication. As shown by reference number 440, if the UE 120 successfully receives the RAR, the UE 120 may transmit a hybrid automatic repeat request (HARD) acknowledgement (ACK).

As indicated above, FIG. 4 is provided as an example. Other examples may differ from what is described with regard to FIG. 4.

Figure 5:
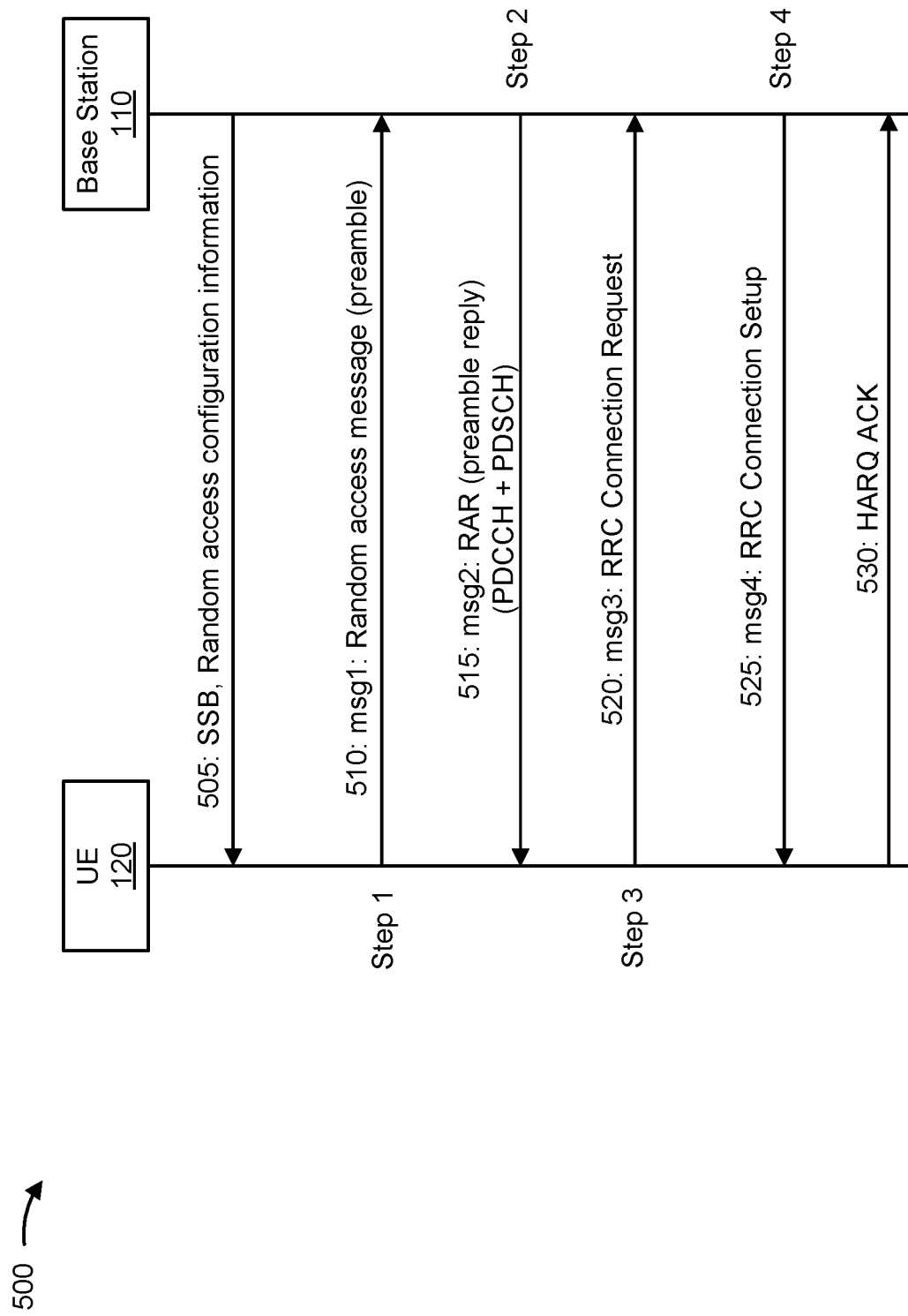
FIG. 5 is a diagram illustrating an example of a four-step random access procedure, in accordance with the present disclosure.

FIG. 5 is a diagram illustrating an example 500 of a four-step random access procedure, in accordance with the present disclosure. As shown in FIG. 5, a base station 110 and a UE 120 may communicate with one another to perform the four-step random access procedure.

As shown by reference number 505, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 510, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 515, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 525, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 530, if the UE 120 successfully receives the RRC connection setup message, the UE 120 may transmit a HARQ ACK.

As indicated above, FIG. 5 is provided as an example. Other examples may differ from what is described with regard to FIG. 5.

Figure 6:
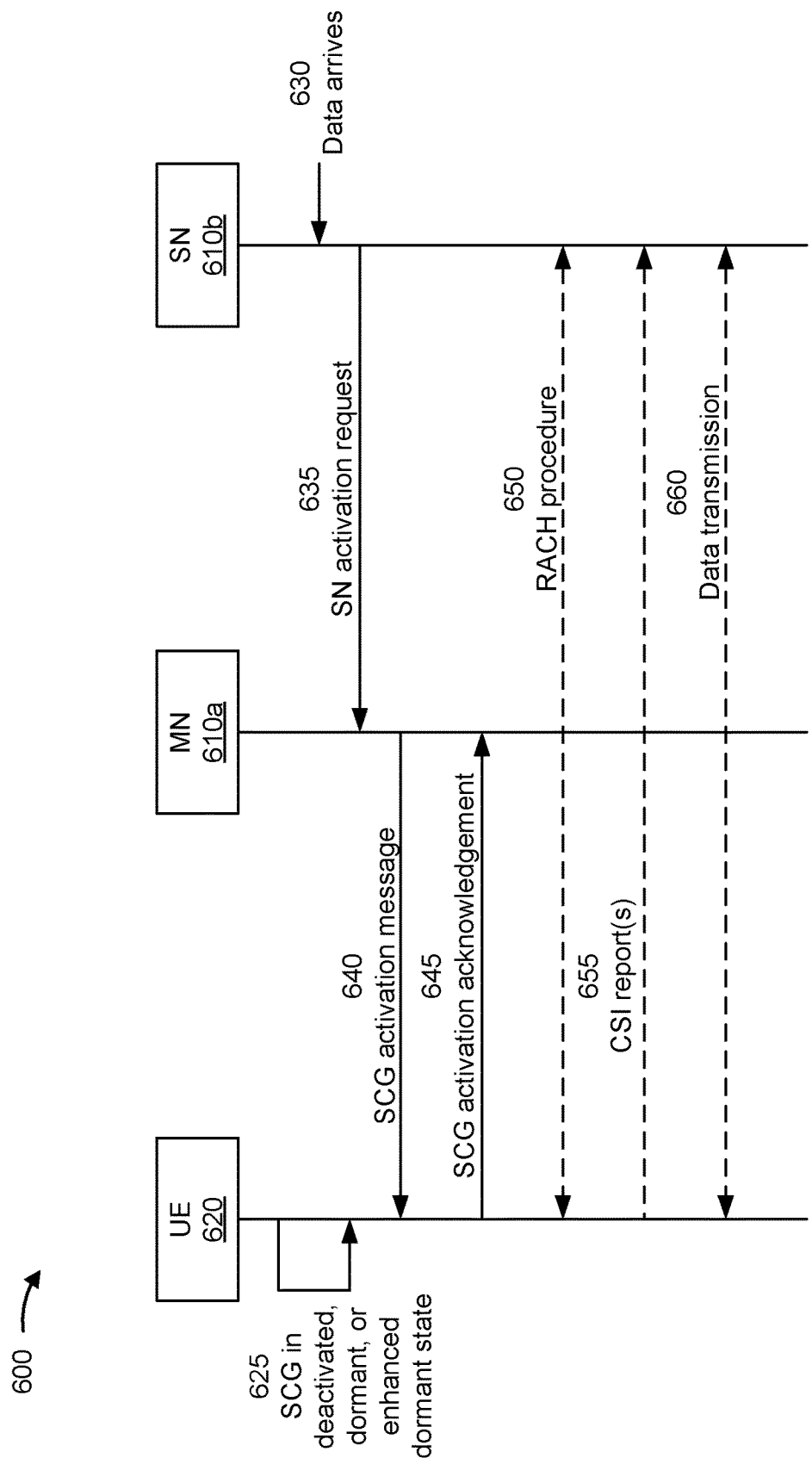
FIG. 6 is a diagram illustrating an example of SCG activation for MR-DC, in accordance with the present disclosure.

FIG. 6 is a diagram illustrating an example 600 of SCG activation for MR-DC, in accordance with the present disclosure. As shown in FIG. 6, an MN 610a (e.g., including a first base station 110a) of an MCG may communicate with an SN 610b (e.g., including a second base station 110b) of an SCG and a UE 620 (e.g., a UE 120). In some aspects, the SN 610b may be associated with a PSCell of the SCG.

As shown in connection with reference number 625, the UE 620 may determine that the SCG is in a deactivated state, a dormant state, or an enhanced dormant state (e.g., as described above in connection with FIG. 3B). For example, the UE 620 may have received a MAC-CE, DCI, and/or other message from the MN 610a and/or the SN 610b, indicating that the SN 610b was moving to a deactivated state, a dormant state, or an enhanced dormant state.

As shown in connection with reference number 630, data may arrive at the SN 610b. In some aspects, the data may include data intended for one or more DRBs that use resources provided by the SCG. For example, the data may be received on an MN-terminated bearer that requires SCG resources.

Accordingly, as shown in connection with reference number 635, the SN 610b may provide an SN activation request to the MN 610a. Further, as shown in connection with reference number 640, the MN 610a may transmit an SCG activation message to the UE 620. In some aspects, the SCG activation message may include a MAC-CE, a DCI, and/or other message, as described above in connection with FIG. 3A.

As shown in connection with reference number 645, the UE 620 may transmit an SCG activation acknowledgement to the MN 610a. In some aspects, the UE 620 may resume use of a lower layer configuration (e.g., a PHY layer configuration, a MAC configuration, an RLC configuration, and/or another layer configuration) for the SN 610b, as described above in connection with FIG. 3A. Accordingly, the UE 620 may transmit the SCG activation acknowledgement based at least in part on resuming use of the lower layer configuration.

Depending on whether UE 620 was in the SCG dormant state or the SCG enhanced dormant state, as shown in connection with reference number 650, the UE 620 may perform a RACH procedure (e.g., a two-step random access procedure as described above in connection with FIG. 4 and/or a four-step random access procedure as described above in connection with FIG. 5) with the SN 610b.

In some aspects, the UE 620 may bypass the RACH procedure based at least in part on whether the UE 620 was in the SCG enhanced dormant state, as described above in connection with FIG. 3B. For example, if the UE 620 was in the SCG dormant state, the UE 620 may perform the RACH procedure after receiving the SCG activation message. The UE 620 may have performed CSI measurements on the PSCell (e.g., the SN 610b) in the SCG dormant state such that, after the UE 620 completes the RACH procedure, the UE 620 may transmit one or more CSI reports to the SN 610b, as shown in connection with reference number 655.

However, if UE 620 was in the SCG enhanced dormant state, the UE 620 may bypass the RACH procedure. In addition to or in lieu of the RACH procedure, the UE 620 may receive scheduling information after receiving the SCG activation message. For example, the UE 620 may have already transmitted one or more CSI reports in the SCG enhanced dormant state, and the SN 610b (and/or the MN 610a) may schedule communications using these CSI reports rather than receiving new CSI reports from the UE 620.

As shown in connection with reference number 660, the UE 620 and the SN 610b may begin data transmission. In some aspects, the data transmission may include the UE 620 receiving, from the SN 610b, the data that had arrived at the SN 610b, as described above in connection with reference number 630. The data transmission may additionally include the UE 620 transmitting HARQ feedback to the SN 610b based at least in part whether the UE 620 successfully received and decoded the data that had arrived at the SN 610b or not. Additionally, or alternatively, the data transmission may include the SN 610b receiving, from the UE 620, data that is intended for the SCG. Accordingly, as described above, the UE 620 may begin data transmission sooner from an SCG enhanced dormant state than from an SCG dormant state.

As indicated above, FIG. 6 is provided as an example. Other examples may differ from what is described with respect to FIG. 6.

In some situations, a UE may detect RLF with an MN of an MCG while the SCG (and thus the UE) is in a deactivated state, a dormant state, or an enhanced dormant state. Typically, the UE undertakes MCG RLF recovery by performing RRC re-establishment with the MCG. RRC re-establishment generally includes the UE performing a cell search, conducting measurements with cells found in the search, and then re-establishing an RRC connection based on the results of the measurements. This procedure is slow and consumes processing and network resources as well as battery power for the UE.

Techniques and apparatuses of the present disclosure allow a UE (e.g., UE 120) to initiate activation of the SCG from the deactivated state, the dormant state, or the enhanced dormant state rather than waiting for an SCG activation message from an MN of an associated MCG (e.g., MN 705a as described below in connection with FIGS. 7 and 8). Accordingly, the UE 120 may undertake MCG RLF recovery using the activated SCG rather than performing RRC re-establishment. As a result, the UE 120 reduces latency and conserves processing and network resources, as well as battery power, as compared with performing a cell search and re-establishing an RRC connection with the MCG. Moreover, if data arrives at an SN of the SCG (e.g., SN 705b as described below in connection with FIGS. 7 and 8) during the MCG RLF recovery, the SN 705b may transmit the data to the UE 120 during the MCG RLF recovery. Accordingly, the SN 705b reduces latency in transmitting the data to the UE 120 by using an already-established channel to transmit the data. Additionally, the SN 705b conserves network and processing resources as compared with establishing a new channel between the SN 705b and the UE 120 to transmit the data.

Figure 7:
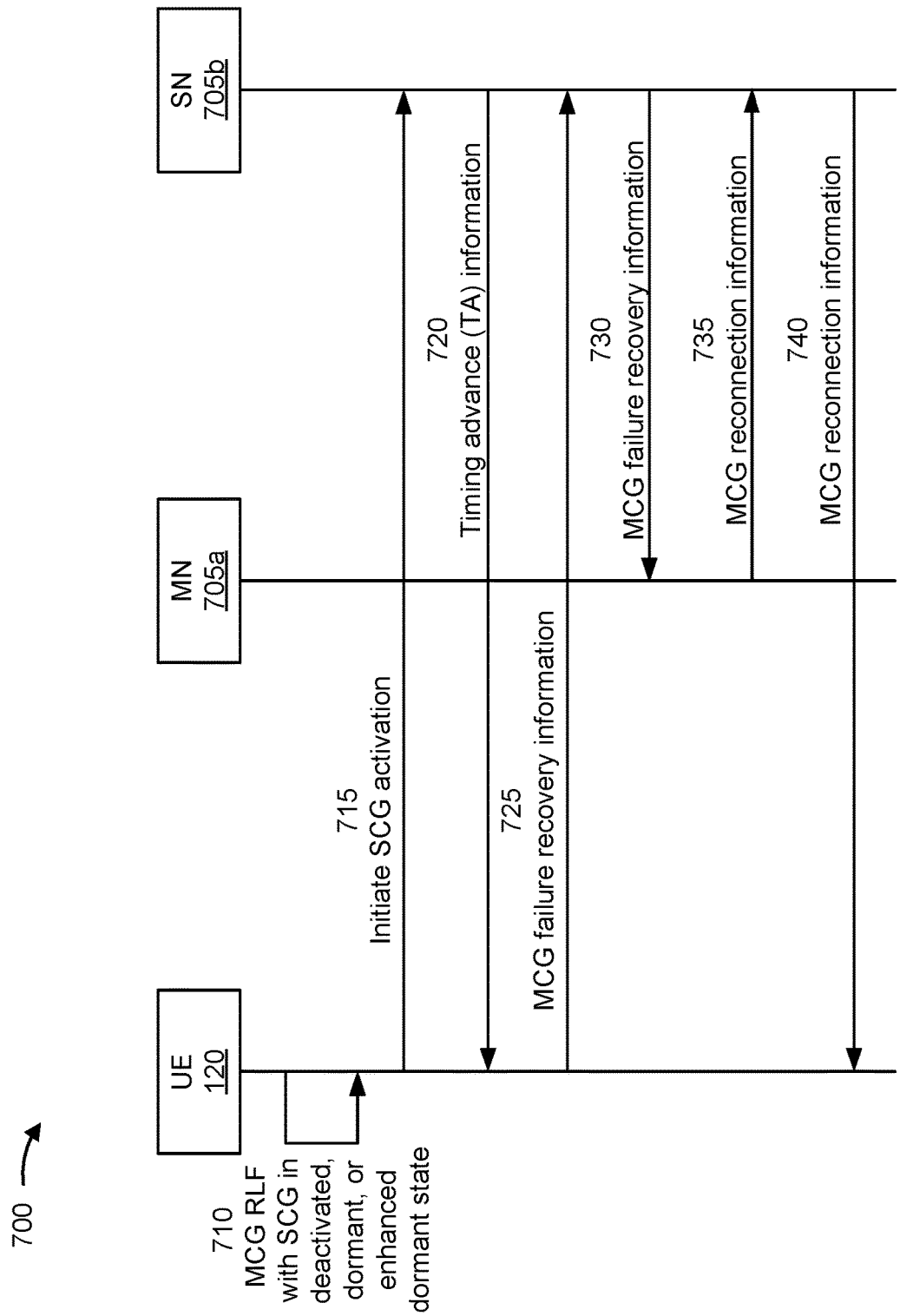
FIG. 7 is a diagram illustrating an example associated with SCG activation for MCG radio link failure (RLF) recovery, in accordance with the present disclosure.

FIG. 7 is a diagram illustrating an example 700 of SCG activation for MCG RLF recovery, in accordance with the present disclosure. As shown in FIG. 7, an MN 705a (e.g., first base station 110a) of an MCG may communicate with an SN 705b (e.g., second base station 110b) of an SCG and a UE (e.g., UE 120). Accordingly, the UE 120 may be configured for MR-DC (e.g., as described above in connection with FIG. 6). For example, the UE 120 may be dual connected with the MCG and SCG (e.g., as described above in connection with FIG. 3A). In some aspects, the SN 705b may be associated with a PSCell of the SCG.

As shown in connection with reference number 710, the UE 120 may detect RLF on the MCG. For example, the UE 120 may determine that an RSRP, an RSSI, a CQI, and/or another measure of channel quality on the MCG satisfies a threshold indicating the RLF and/or fail to decode a PDCCH message and/or a PDSCH message transmitted by the MN 705a and/or another node of the MCG. In some aspects, the UE 120 may refrain from transmitting a request for RRC re-establishment based at least in part on detecting the RLF. For example, the UE 120 may perform SCG activation, as described below, in lieu of performing RRC re-establishment.

As further shown in connection with reference number 710, the UE 120 may determine a state of the SCG. For example, the UE 120 may retrieve the state of the PSCell and/or another cell of the SCG as stored in a memory of the UE 120. Additionally, or alternatively, the UE 120 may have previously received a MAC-CE, DCI, and/or other message from the MN 705a and/or the SN 705b that indicates the state of the SCG.

As shown in connection with reference number 715, the UE 120 may initiate activation of the SCG based at least in part on the state of the SCG. In some aspects, the UE 120 may initiate the activation based at least in part on the state (e.g., determined as described above in connection with reference number 710) being a deactivated state, a dormant state, or an enhanced dormant state (e.g., as described above in connection with FIG. 3B).

In some aspects, the UE 120 may initiate a random access procedure on the SCG (e.g., on the PSCell of the SCG) in order to initiate the activation of the SCG. For example, the UE 120 may initiate the random access procedure by transmitting, on the SCG (e.g., on the PSCell of the SCG), a random access preamble. For example, the UE 120 may transmit a two-step preamble (e.g., msgA as described above in connection with FIG. 4) or a four-step preamble (e.g., msg1 as described above in connection with FIG. 5). Additionally, or alternatively, the UE 120 may transmit a scheduling request (SR) and/or another message on the SCG (e.g., on the PSCell of the SCG) in order to initiate the activation of the SCG.

As shown in connection with reference number 720, the SN 705b may transmit, and the UE 120 may receive, TA information over the SCG (e.g., over the PSCell of the SCG). For example, the TA information may be included in a random access response (e.g., included in msgB as described above in connection with FIG. 4 or included in msg2 as described above in connection with FIG. 5). In some aspects, the UE 120 may receive the TA based at least in part on initiating the activation of the SCG (e.g., by transmitting a random access preamble, an SR, and/or another message).

As shown in connection with reference number 725, the UE 120 may transmit MCG failure recovery information over the SCG (e.g., on the PSCell of the SCG). In some aspects, the MCG failure recovery information may be included in msg3 of a random access procedure. For example, the UE 120 may transmit the msg3 as described above in connection with FIG. 5. In some aspects, the UE 120 may transmit the MCG failure recovery information based at least in part on the TA information (e.g., received as described above in connection with reference number 720). For example, the UE 120 may determine a subframe in which to transmit the MCG failure recovery information based at least in part on the TA information.

As shown in connection with reference number 730, the SN 705b may transmit the MCG failure recovery information to the MCG. For example, the SN 705b may use a backhaul (e.g., backhaul link 320 as described above in connection with FIG. 3A) to transmit the MCG failure recovery information to the MN 705a and/or another node of the MCG. In some aspects, the SN 705b may forward the MCG failure recovery information, received from the UE 120 as described above in connection with reference number 725, to the MN 705a. As an alternative, the SN 705b may generate a message based at least in part on the MCG failure recovery information (e.g., a new RRC message, an F1 application protocol (F1-AP) message, and/or an Xn message) and transmit the generated message to the MN 705a.

As shown in connection with reference number 735, the MN 705a may transmit, and the SN 705b may receive, MCG reconnection information. In some aspects, the MN 705a may transmit the MCG reconnection information based at least in part on the MCG failure recovery information (e.g., as described above in connection with reference number 730).

As shown in connection with reference number 740, the SN 705b may transmit, and the UE 120 may receive, on the SCG (e.g., over the PSCell of the SCG) and based at least in part on the MCG failure recovery information, MCG reconnection information. In some aspects, the SN 705b may forward the MCG reconnection information, received from the MN 705a as described in connection with reference number 735, to the UE 120. As an alternative, the SN 705b may generate a message based at least in part on the MCG reconnection information (e.g., a new RRC message, a RACH message, and/or another message) and transmit the generated message to the UE 120.

By using techniques as described in connection with FIG. 7, the UE 120 may initiate activation of an SCG activated state from a deactivated state, a dormant state, or an enhanced dormant state rather than waiting for an SCG activation message from the MN 705a and/or another node of the MCG. Accordingly, the UE 120 may undertake MCG RLF recovery using the activated SCG rather than performing RRC re-establishment. As a result, the UE 120 may perform MCG RLF recovery more quickly as well as conserve network resources, processing resources, and battery power as compared with performing a cell search and re-establishing an RRC connection with the MCG.

As indicated above, FIG. 7 is provided as an example. Other examples may differ from what is described with respect to FIG. 7.

Figure 8:
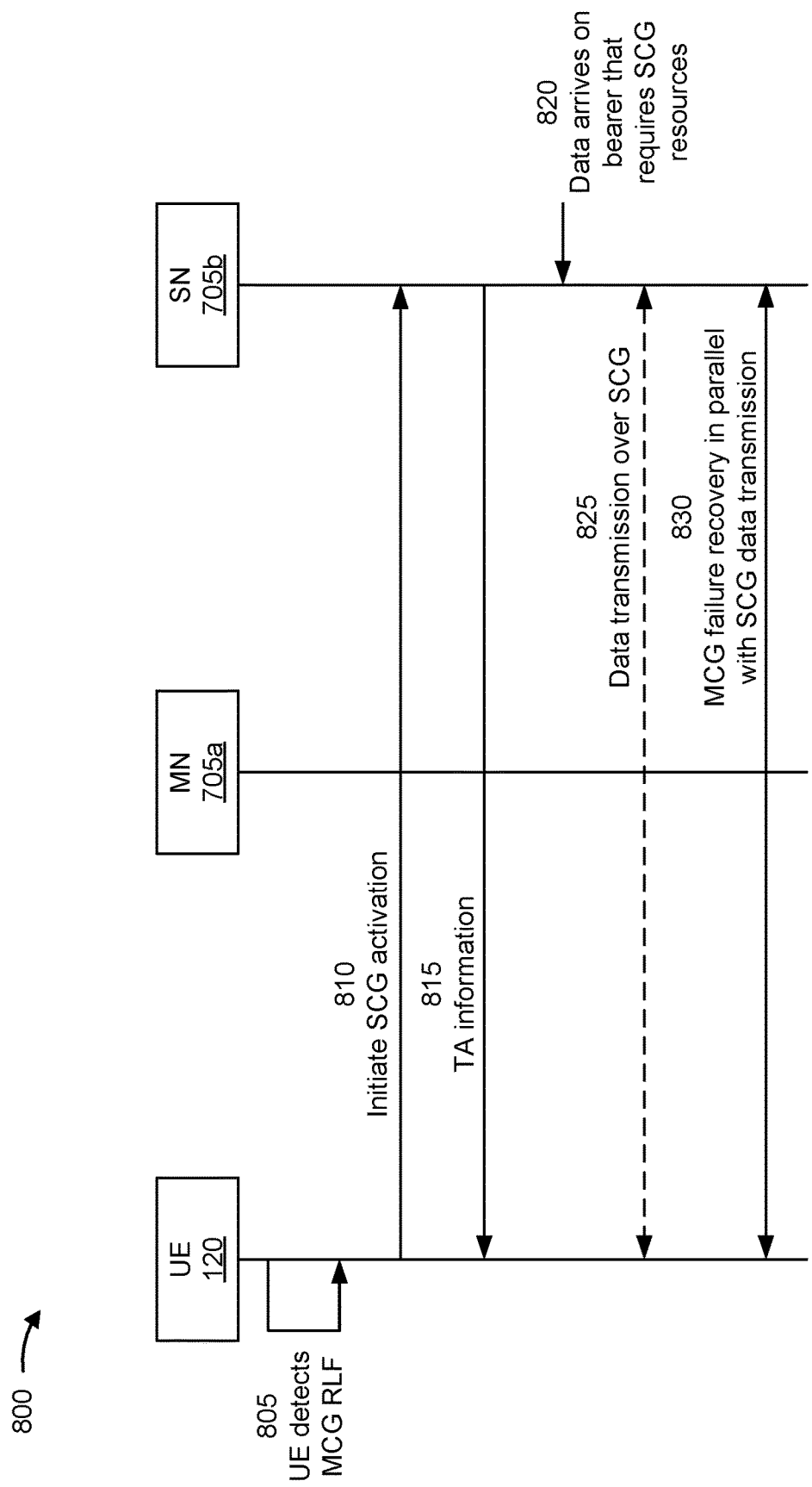
FIG. 8 is a diagram illustrating an example associated with SCG data transmission concurrent with MCG RLF recovery, in accordance with the present disclosure.

FIG. 8 is a diagram illustrating an example 800 of SCG data transmission concurrent with MCG RLF recovery, in accordance with the present disclosure. As shown in FIG. 8, an MN 705a (e.g., first base station 110a) of an MCG may communicate with an SN 705b (e.g., second base station 110b) of an SCG and a UE (e.g., UE 120). Accordingly, the UE 120 may be configured for MR-DC (e.g., as described above in connection with FIG. 6). For example, the UE 120 may be dual connected with the MCG and SCG (e.g., as described above in connection with FIG. 3A). In some aspects, the SN 705b may be associated with a PSCell of the SCG.

As shown in connection with reference number 805, the UE 120 may detect RLF on the MCG. For example, the UE 120 may detect the RLF similarly to the detection described above in connection with reference number 710 of FIG. 7.

As shown in connection with reference number 810, the UE 120 may initiate activation of the SCG based at least in part on a state of the SCG. For example, the UE 120 may initiate activation of the SCG similarly to the initiation described above in connection with reference number 715 of FIG. 7. In some aspects, the UE 120 may initiate the activation based at least in part on the state of the SCG being a deactivated state, a dormant state, or an enhanced dormant state (e.g., as described above in connection with FIG. 3B).

In some aspects, the UE 120 may initiate a random access procedure on the SCG (e.g., on the PSCell of the SCG) in order to initiate the activation of the SCG. For example, the UE 120 may initiate the random access procedure by transmitting, on the SCG (e.g., on the PSCell of the SCG), a random access preamble. For example, the UE 120 may transmit a random access preamble on the SCG (e.g., over the PSCell of the SCG) in order to initiate the random access procedure. For example, the UE 120 may transmit a two-step preamble (e.g., msgA as described above in connection with FIG. 4) or a four-step preamble (e.g., msg1 as described above in connection with FIG. 5). Additionally, or alternatively, the UE 120 may transmit an SR and/or another message on the SCG (e.g., on the PSCell of the SCG) in order to initiate the activation of the SCG.

As shown in connection with reference number 815, the SN 705b may transmit, and the UE 120 may receive, TA information over the SCG (e.g., over the PSCell of the SCG). For example, the SN 705b may transmit, and the UE 120 may receive, the TA information similarly to the transmission and reception described above in connection with reference number 720 of FIG. 7.

As shown in connection with reference number 820, the SN 705b may receive a data transmission intended for the UE 120. For example, the data transmission may include a payload intended for delivery to the UE 120 on a downlink channel, such as a PDSCH, a RACH, and/or another downlink channel from the SN 705b to the UE 120. In some aspects, the data may include data intended for one or more DRBs that use resources provided by the SCG. For example, as furthers shown in connection with reference number 820, the data may be received on an MN-terminated bearer that requires SCG resources. In some aspects, the SN 705b may receive the data transmission intended for the UE 120 from a core network supporting the SCG. For example, the SN 705b may receive the data from a network controller (e.g., network controller 130 of FIG. 1) that is a part of the core network.

As shown in connection with reference number 825, the SN 705b may transmit, and the UE 120 may receive, the data transmission over the SCG (e.g., on the PSCell of the SCG). For example, the SN 705b may transmit the data transmission using a RACH established by a random access procedure (e.g., established as part of activating the SCG, as described above in connection with reference numbers 810 and 815). In some aspects, the SN 705b may transmit, and the UE 120 may receive, the data transmission before failure recovery for the MCG is complete (e.g., before the UE 120 receives MCG reconnection information). Accordingly, the SN 705b may transmit the data transmission to the UE 120 concurrently with receiving MCG failure recovery information from the UE 120 and/or transmitting the MCG failure recovery information (and/or a message based at least in part on the MCG failure recovery information) to the MN 705a. In some aspects, the data transmission may additionally include the UE 120 transmitting HARQ feedback to the SN 705b based at least in part whether the UE 120 successfully received and decoded the data that had arrived at the SN 705b or not. Additionally, or alternatively, the data transmission may include the SN 705b receiving, from the UE 120, data that is intended for the SCG. Accordingly, the UE 120 may transmit, and the SN 705b may receive, a data transmission before failure recovery for the MCG is complete (e.g., before the UE 120 receives MCG reconnection information).

As shown in connection with reference number 830, the UE 120 may perform MCG failure recovery. For example, the UE 120 may transmit MCG failure recovery information over the SCG (e.g., on the PSCell of the SCG). Accordingly, the SN 705b may transmit the MCG failure recovery information to the MCG, such that the MN 705a may transmit, and the SN 705b may receive, MCG reconnection information. The UE 120 may receive, on the SCG (e.g., on the PSCell of the SCG) and based at least in part on transmitting the MCG failure recovery information, the MCG reconnection information. In some aspects, the UE 120, the MN 705a, and the SN 705b may complete failure recovery for the MCG as described above in connection with reference numbers 730, 735, and 740 of FIG. 7. Accordingly, steps performed in connection with reference number 830 may be similar to steps performed in connection with reference numbers 725, 730, and 735 of FIG. 7. As described above in connection with reference number 825, the SN 705b may perform failure recovery for the MCG in parallel (e.g., concurrently) with transmitting data to the UE 120.

By using techniques as described in connection with FIG. 8, the SN 705b may transmit data to the UE 120 using a RACH (and/or other downlink channel) established during MCG RLF recovery. As a result, the SN 705b reduces latency in transmitting the data to the UE 120. Additionally, the SN 705b conserves network and processing resources as compared with establishing a new channel between the SN 705b and the UE 120 to transmit the data.

As indicated above, FIG. 8 is provided as an example. Other examples may differ from what is described with respect to FIG. 8.

Figure 9:
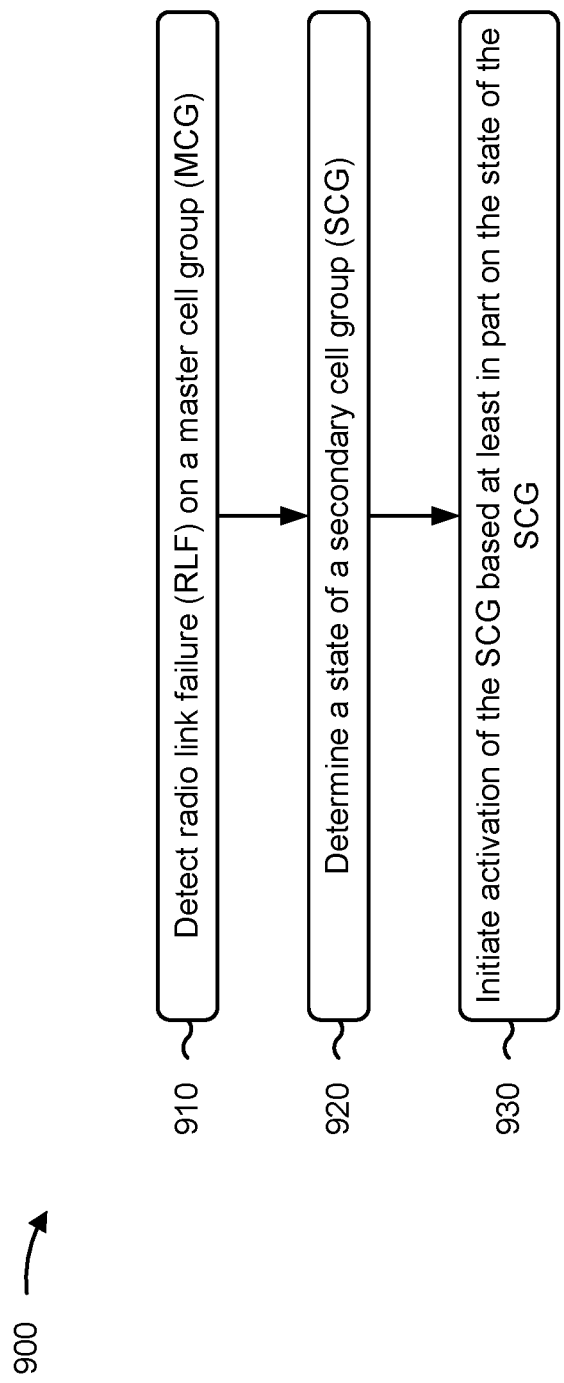
FIG. 9 is a diagram illustrating an example process performed by a UE, in accordance with the present disclosure.

FIG. 9 is a diagram illustrating an example process 900 performed, for example, by a UE, in accordance with various aspects of the present disclosure. Example process 900 is an example where the UE (e.g., UE 120) performs operations associated with activating an SCG based at least in part on detecting RLF with an MCG.

As shown in FIG. 9, in some aspects, process 900 may include detecting RLF on an MCG (block 910). For example, the UE (e.g., using antenna 252, demodulator 254, MIMO detector 256, receive processor 258, transmit processor 264, TX MIMO processor 266, modulator 254, controller/processor 280, and/or memory 282) may detect the RLF on the MCG, as described above.

As further shown in FIG. 9, in some aspects, process 900 may include determining a state of an SCG (block 920). For example, the UE (e.g., using antenna 252, demodulator 254, MIMO detector 256, receive processor 258, transmit processor 264, TX MIMO processor 266, modulator 254, controller/processor 280, and/or memory 282) may determine the state of the PSCell of the SCG, as described above.

As further shown in FIG. 9, in some aspects, process 900 may include initiating activation of the SCG based at least in part on the state of the SCG (block 930). For example, the UE (e.g., using antenna 252, demodulator 254, MIMO detector 256, receive processor 258, transmit processor 264, TX MIMO processor 266, modulator 254, controller/processor 280, and/or memory 282) may initiate activation of the SCG based at least in part on the state of the SCG, as described above.

Process 900 may include additional aspects, such as any single aspect or any combination of aspects described below and/or in connection with one or more other processes described elsewhere herein.

In a first aspect, the UE is configured for MR-DC.

In a second aspect, alone or in combination with the first aspect, initiating activation of the SCG includes initiating (e.g., using antenna 252, demodulator 254, MIMO detector 256, receive processor 258, transmit processor 264, TX MIMO processor 266, modulator 254, controller/processor 280, and/or memory 282) a random access procedure on a PSCell of the SCG.

In a third aspect, alone or in combination with one or more of the first and second aspects, initiating the random access procedure includes transmitting (e.g., using antenna 252, transmit processor 264, TX MIMO processor 266, modulator 254, controller/processor 280, and/or memory 282) a random access preamble on the PSCell.

In a fourth aspect, alone or in combination with one or more of the first through third aspects, process 900 further includes receiving (e.g., using antenna 252, demodulator 254, MIMO detector 256, receive processor 258, controller/processor 280, and/or memory 282) TA information over the SCG based at least in part on initiating activation of the SCG.

In a fifth aspect, alone or in combination with one or more of the first through fourth aspects, process 900 further includes transmitting (e.g., using antenna 252, transmit processor 264, TX MIMO processor 266, modulator 254, controller/processor 280, and/or memory 282) MCG failure recovery information over the SCG.

In a sixth aspect, alone or in combination with one or more of the first through fifth aspects, the activation of the SCG is initiated based at least in part on the state being a deactivated state, a dormant state, or an enhanced dormant state.

In a seventh aspect, alone or in combination with one or more of the first through sixth aspects, process 900 further includes refraining from transmitting (e.g., using antenna 252, transmit processor 264, TX MIMO processor 266, modulator 254, controller/processor 280, and/or memory 282) a request for RRC re-establishment on the MCG based at least in part on detecting the RLF.

In an eighth aspect, alone or in combination with one or more of the first through seventh aspects, process 900 further includes transmitting (e.g., using antenna 252, transmit processor 264, TX MIMO processor 266, modulator 254, controller/processor 280, and/or memory 282) MCG failure recovery information over the SCG, which is forwarded to a master node of the MCG; and receiving, on the SCG and based at least in part on transmitting the MCG failure recovery information, MCG reconnection information.

In a ninth aspect, alone or in combination with one or more of the first through eighth aspects, process 900 further includes receiving (e.g., using antenna 252, demodulator 254, MIMO detector 256, receive processor 258, controller/processor 280, and/or memory 282) or transmitting (e.g., using antenna 252, transmit processor 264, TX MIMO processor 266, modulator 254, controller/processor 280, and/or memory 282), over the SCG and before failure recovery for the MCG is complete, a data transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
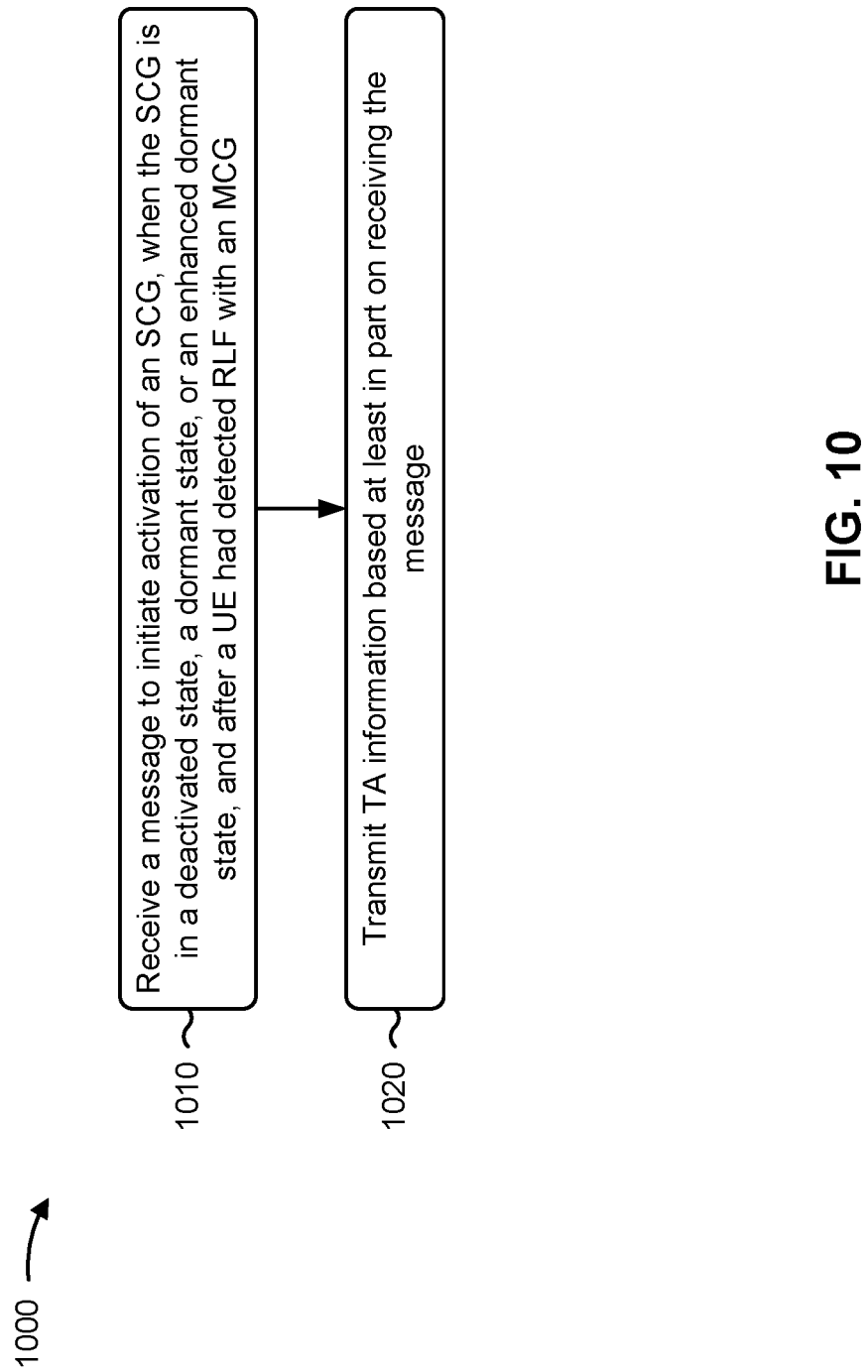
FIG. 10 is a diagram illustrating an example process performed by a base station, in accordance with the present disclosure.

FIG. 10 is a diagram illustrating an example process 1000 performed, for example, by a base station within an SCG, in accordance with various aspects of the present disclosure. Example process 1000 is an example where the base station (e.g., SN 705*b* and/or base station 110) performs operations associated with activating an SCG based at least in part on RLF with an MCG.

As shown in FIG. 10, in some aspects, process 1000 may include receiving, from a UE (e.g., UE 120), a message to initiate activation of the SCG (block 1010). For example, the base station (e.g., using antenna 234, demodulator 232, MIMO detector 236, receive processor 238, controller/processor 240, memory 242, and/or scheduler 246) may receive the message to initiate activation of the SCG, as described above. In some aspects, when the base station is receiving the message, the SCG is in a deactivated state, a dormant state, or an enhanced dormant state. Additionally, in some aspects, the base station receives the message after the UE had detected RLF with an MCG.

As further shown in FIG. 10, in some aspects, process 1000 may include transmitting, to the UE, TA information based at least in part on receiving the message (block 1020). For example, the base station (e.g., using transmit processor 220, TX MIMO processor 230, modulator 232, antenna 234, controller/processor 240, memory 242, and/or scheduler 246) may transmit the TA information based at least in part on receiving the message, as described above.

Process 1000 may include additional aspects, such as any single aspect or any combination of aspects described below and/or in connection with one or more other processes described elsewhere herein.

In a first aspect, the UE is configured for MR-DC with the MCG and the SCG.

In a second aspect, alone or in combination with the first aspect, the message to initiate activation of the SCG includes a message to initiate a random access procedure on a PSCell of the SCG.

In a third aspect, alone or in combination with one or more of the first and second aspects, the message to initiate a random access procedure includes a random access preamble.

In a fourth aspect, alone or in combination with one or more of the first through third aspects, process 1000 further includes receiving (e.g., using antenna 234, demodulator 232, MIMO detector 236, receive processor 238, controller/processor 240, memory 242, and/or scheduler 246), from the UE and based at least in part on the TA information, MCG failure recovery information.

In a fifth aspect, alone or in combination with one or more of the first through fourth aspects, process 1000 further includes transmitting (e.g., using transmit processor 220, TX MIMO processor 230, modulator 232, antenna 234, controller/processor 240, memory 242, and/or scheduler 246) the MCG failure recovery information to a master node of the MCG.

In a sixth aspect, alone or in combination with one or more of the first through fifth aspects, process 1000 further includes receiving (e.g., using antenna 234, demodulator 232, MIMO detector 236, receive processor 238, controller/processor 240, memory 242, and/or scheduler 246), from the master node and based at least in part on transmitting the MCG failure recovery information, MCG reconnection information; and transmitting (e.g., using transmit processor 220, TX MIMO processor 230, modulator 232, antenna 234, controller/processor 240, memory 242, and/or scheduler 246), to the UE, the MCG reconnection information.

In a seventh aspect, alone or in combination with one or more of the first through sixth aspects, process 1000 further includes receiving (e.g., using antenna 234, demodulator 232, MIMO detector 236, receive processor 238, controller/processor 240, memory 242, and/or scheduler 246) a data transmission intended for the UE; and transmitting (e.g., using transmit processor 220, TX MIMO processor 230, modulator 232, antenna 234, controller/processor 240, memory 242, and/or scheduler 246), to the UE and before failure recovery for the MCG is complete, the data transmission.

In an eighth aspect, alone or in combination with one or more of the first through seventh aspects, the data transmission intended for the UE is received from a core network supporting the SCG.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: detecting radio link failure (RLF) on a master cell group (MCG); determining a state of a secondary cell group (SCG); and initiating, by the UE, activation of the SCG based at least in part on the state of the SCG.

Aspect 2: The method of Aspect 1, wherein the UE is configured for multi-radio access technology dual connectivity.

Aspect 3: The method of any one of Aspects 1 through 2, wherein initiating activation of the SCG comprises initiating a random access procedure on a primary secondary cell (PSCell) of the SCG.

Aspect 4: The method of Aspect 3, wherein initiating the random access procedure comprises transmitting a random access preamble on the PSCell.

Aspect 5: The method of any one of Aspects 1 through 4, further comprising: receiving timing advance (TA) information over the SCG.

Aspect 6: The method of any one of Aspects 1 through 5, further comprising: transmitting MCG failure recovery information over the SCG.

Aspect 7: The method of any one of Aspects 1 through 6, wherein the activation of the SCG is initiated based at least in part on the state being a deactivated state, a dormant state, or an enhanced dormant state.

Aspect 8: The method of any one of Aspects 1 through 7, further comprising refraining from transmitting a request for radio resource control re-establishment on the MCG based at least in part on detecting the RLF.

Aspect 9: The method of any one of Aspects 1 through 8, further comprising: transmitting MCG failure recovery information over the SCG, which is forwarded to a master node of the MCG; and receiving, on the SCG and based at least in part on transmitting the MCG failure recovery information, MCG reconnection information.

Aspect 10: The method of any one of Aspects 1 through 9, further comprising: receiving or transmitting, over the SCG and before failure recovery for the MCG is complete, a data transmission.

Aspect 11: A method of wireless communication performed by a base station within a secondary cell group (SCG), comprising: receiving, from a user equipment (UE), a message to initiate activation of the SCG, wherein, when the base station receives the message, the SCG is in a deactivated state, a dormant state, or an enhanced dormant state, and the UE had detected radio link failure (RLF) with a master cell group (MCG); and transmitting, to the UE, timing advance (TA) information based at least in part on receiving the message.

Aspect 12: The method of Aspect 11, wherein the UE is configured for multi-radio access technology dual connectivity with the MCG and the SCG.

Aspect 13: The method of any one of Aspects 11 through 12, wherein the message to initiate activation of the SCG comprises a message to initiate a random access procedure on a primary secondary cell (PSCell) of the SCG.

Aspect 14: The method of Aspect 13, wherein the message to initiate the random access procedure includes a random access preamble.

Aspect 15: The method of any one of Aspects 11 through 14, further comprising: receiving, from the UE and based at least in part on the TA information, MCG failure recovery information.

Aspect 16: The method of Aspect 15, further comprising: transmitting the MCG failure recovery information to a master node of the MCG.

Aspect 17: The method of Aspect 16, further comprising: receiving, from the master node and based at least in part on transmitting the MCG failure recovery information, MCG reconnection information; and transmitting, to the UE, the MCG reconnection information.

Aspect 18: The method of any one of Aspects 11 through 17, further comprising: receiving a data transmission intended for the UE; and transmitting, to the UE and before failure recovery for the MCG is complete, the data transmission.

Aspect 19: The method of Aspect 18, wherein the data transmission intended for the UE is received from a core network supporting the SCG.

Aspect 20: An apparatus for wireless communication at a device, comprising a processor; memory coupled with the processor; and instructions stored in the memory and executable by the processor to cause the apparatus to perform the method of one or more Aspects of Aspects 1-10.

Aspect 21: A device for wireless communication, comprising a memory and one or more processors coupled to the memory, the memory and the one or more processors configured to perform the method of one or more Aspects of Aspects 1-10.

Aspect 22: An apparatus for wireless communication, comprising at least one means for performing the method of one or more Aspects of Aspects 1-10.

Aspect 23: A non-transitory computer-readable medium storing code for wireless communication, the code comprising instructions executable by a processor to perform the method of one or more Aspects of Aspects 1-10.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 25: An apparatus for wireless communication at a device, comprising a processor; memory coupled with the processor; and instructions stored in the memory and executable by the processor to cause the apparatus to perform the method of one or more Aspects of Aspects 11-19.

Aspect 26: A device for wireless communication, comprising a memory and one or more processors coupled to the memory, the memory and the one or more processors configured to perform the method of one or more Aspects of Aspects 11-19.

Aspect 27: An apparatus for wireless communication, comprising at least one means for performing the method of one or more Aspects of Aspects 11-19.

Aspect 28: A non-transitory computer-readable medium storing code for wireless communication, the code comprising instructions executable by a processor to perform the method of one or more Aspects of Aspects 11-19.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 11-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled with the one or more memories, the one or more processors configured to:
   detect radio link failure (RLF) on a master cell group (MCG);
   determine a state of a secondary cell group (SCG) based at least in part on the RLF on the MCG, wherein the state of the SCG is a deactivated state, a dormant state, or an enhanced-dormant state;
   initiate activation of the SCG based at least in part on the state of the SCG, wherein the activation of the SCG comprises transmitting MCG failure recovery information in a random access procedure on the SCG without performing a radio resource control procedure and without transmitting a request for radio resource control re-establishment on the MCG based at least in part on detecting the RLF;
   receive, on the SCG and based at least in part on transmitting the MCG failure recovery information, MCG reconnection information; and
   wherein the one or more processors are further configured to: receive or transmit, over the SCG and before failure recovery for the MCG is complete, a data transmission.

2. The UE of claim 1, wherein the UE is configured for multi-radio access technology dual connectivity.

3. The UE of claim 1, wherein initiating activation of the SCG comprises initiating the random access procedure on a primary secondary cell (PSCell) of the SCG.

4. The UE of claim 3, wherein initiating the random access procedure comprises transmitting a random access preamble on the PSCell.

5. The UE of claim 1, wherein the one or more processors are further configured to: receive timing advance (TA) information over the SCG based at least in part on initiating activation of the SCG.

6. The UE of claim 1, wherein the one or more processors are further configured to: transmit the MCG failure recovery information over the SCG, which is forwarded to a master node of the MCG.

7. The UE of claim 1, wherein the state of the SCG is the enhanced-dormant state, further comprising: operating according to the enhanced-dormant state of the SCG.

8. The UE of claim 7, wherein operating according to the enhanced-dormant state of the SCG comprises one or more of:
   refraining from monitoring a physical downlink control channel on a primary secondary cell (PSCell) of the SCG; performing channel state information (CSI) measurements in an enhanced dormant downlink bandwidth part (BWP) on the PSCell;
   transmitting CSI reports in a physical uplink control channel for the PSCell;
   maintaining uplink timing alignment with a secondary node in the PSCell;
   performing radio resource management measurements on the PSCell; or
   refraining from performing radio link monitoring measurements.

9. The UE of claim 1, wherein the state of the SCG is the deactivated state, further comprising: operating according to the deactivated state of the SCG.

10. The UE of claim 9, wherein operating according to the deactivated state of the SCG comprises one or more of:
    refraining from monitoring a physical downlink control channel on a primary secondary cell (PSCell) of the SCG; refraining from performing channel state information (CSI) measurements on the PSCell;
    refraining from transmitting uplink communications on the PSCell;
    refraining from maintaining uplink timing alignment with a secondary node in the PSCell;
    performing radio resource management measurements on the PSCell; or
    refraining from performing radio link monitoring measurements.

11. The UE of claim 1, wherein the state of the SCG is the dormant state, further comprising: operating according to the dormant state of the SCG.

12. A method of wireless communication performed by a user equipment (UE), comprising:
- detecting radio link failure (RLF) on a master cell group (MCG);
- determining a state of a secondary cell group (SCG) based at least in part on the RLF on the MCG, wherein the state of the SCG is a deactivated state, a dormant state, or an enhanced-dormant state;
- initiating activation of the SCG based at least in part on the state of the SCG, wherein the activation of the SCG comprises transmitting MCG failure recovery information in a random access procedure on the SCG without performing a radio resource control procedure and without transmitting a request for radio resource control re-establishment on the MCG based at least in part on detecting the RLF;
- receiving, on the SCG and based at least in part on transmitting the MCG failure recovery information, MCG reconnection information; and
- receiving or transmitting, over the SCG and before failure recovery for the MCG is complete, a data transmission.

13. The method of claim 12, wherein initiating activation of the SCG comprises initiating the random access procedure on a primary secondary cell (PSCell) of the SCG.

14. The method of claim 13, wherein initiating the random access procedure comprises transmitting a random access preamble on the PSCell.

15. The method of claim 12, further comprising: receiving timing advance (TA) information over the SCG based at least in part on initiating activation of the SCG.

16. The method of claim 12, wherein the UE is configured for multi-radio access technology dual connectivity.

17. The method of claim 12, further comprising: transmitting the MCG failure recovery information over the SCG, which is forwarded to a master node of the MCG.

18. The method of claim 12, wherein the state of the SCG is the enhanced-dormant state, further comprising: operating according to the enhanced-dormant state of the SCG.

19. The method of claim 12, wherein the state of the SCG is the deactivated state, further comprising: operating according to the deactivated state of the SCG.

20. The method of claim 12, wherein the state of the SCG is the dormant state, further comprising: operating according to the dormant state of the SCG.

21. A non-transitory computer-readable medium storing a set of instructions for wireless communication, the set of instructions comprising:
- one or more instructions that, when executed by one or more processors of a user equipment (UE), cause the UE to:
- detect radio link failure (RLF) on a master cell group (MCG);
- determine a state of a secondary cell group (SCG) based at least in part on the RLF on the MCG, wherein the state of the SCG is a deactivated state, a dormant state, or an enhanced-dormant state;
- initiate activation of the SCG based at least in part on the state of the SCG, wherein the activation of the SCG comprises transmitting MCG failure recovery information in a random access procedure on the SCG without performing a radio resource control procedure and without transmitting a request for radio resource control re-establishment on the MCG based at least in part on detecting the RLF;
- receive, on the SCG and based at least in part on transmitting the MCG failure recovery information, MCG reconnection information; and
- receiving or transmitting, over the SCG and before failure recovery for the MCG is complete, a data transmission.

22. The non-transitory computer-readable medium of claim 21, wherein the UE is configured for multi-radio access technology dual connectivity.

23. The non-transitory computer-readable medium of claim 21, wherein initiating activation of the SCG comprises initiating the random access procedure on a primary secondary cell (PSCell) of the SCG.

24. The non-transitory computer-readable medium of claim 23, wherein initiating the random access procedure comprises transmitting a random access preamble on the PSCell.

25. The non-transitory computer-readable medium of claim 21, wherein the one or more instructions cause the UE to: receive timing advance (TA) information over the SCG based at least in part on initiating activation of the SCG.

26. The non-transitory computer-readable medium of claim 21, wherein the one or more instructions cause the UE to: transmit MCG failure recovery information over the SCG, which is forwarded to a master node of the MCG.

27. An apparatus for wireless communication, comprising:
- means for detecting radio link failure (RLF) on a master cell group (MCG);
- means for determining a state of a secondary cell group (SCG) based at least in part on the RLF on the MCG, wherein the state of the SCG is a deactivated state, a dormant state, or an enhanced-dormant state;
- means for initiating activation of the SCG based at least in part on the state of the SCG, wherein the activation of the SCG comprises transmitting MCG failure recovery information in a random access procedure on the SCG without performing a radio resource control procedure and without transmitting a request for radio resource control re-establishment on the MCG based at least in part on detecting the RLF;
- means for receiving, on the SCG and based at least in part on transmitting the MCG failure recovery information, MCG reconnection information; and
- means for receiving or transmitting, over the SCG and before failure recovery for the MCG is complete, a data transmission.

* * * * *